(12) United States Patent
Lippmann et al.

(10) Patent No.: US 7,971,252 B2
(45) Date of Patent: Jun. 28, 2011

(54) GENERATING A MULTIPLE-PREREQUISITE ATTACK GRAPH

(75) Inventors: Richard P. Lippmann, Wayland, MA (US); Kyle W. Ingols, Arlington, MA (US); Keith J. Piwowarski, Leominster, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 900 days.

(21) Appl. No.: 11/760,158

(22) Filed: Jun. 8, 2007

(65) Prior Publication Data
US 2009/0293128 A1    Nov. 26, 2009

Related U.S. Application Data

(60) Provisional application No. 60/804,298, filed on Jun. 9, 2006.

(51) Int. Cl.
*G06F 21/00* (2006.01)
(52) U.S. Cl. .......................... 726/23; 726/25; 707/999.1
(58) Field of Classification Search .................... 726/25, 726/23; 707/999.1
See application file for complete search history.

(56) References Cited

U.S. PATENT DOCUMENTS

| | | | |
|---|---|---|---|
| 207,384 A | 8/1878 | Beck | |
| 3,776,365 A | 12/1973 | Richards | |
| 4,127,183 A | 11/1978 | McLarty | |
| 4,236,597 A | 12/1980 | Kiss et al. | |
| 4,281,740 A | 8/1981 | Weiss et al. | |
| 4,751,980 A | 6/1988 | DeVane | |
| 5,260,523 A | 11/1993 | Pettersson et al. | |
| 5,313,616 A | 5/1994 | Cline et al. | |
| 5,679,931 A | 10/1997 | Furse et al. | |
| 5,850,516 A | 12/1998 | Schneier | |
| 5,859,393 A | 1/1999 | Cummins, Jr. et al. | |
| 6,298,445 B1 * | 10/2001 | Shostack et al. | 726/25 |
| 6,332,511 B1 | 12/2001 | Parlato et al. | |

(Continued)

FOREIGN PATENT DOCUMENTS
WO    WO 2004/031953    4/2004

OTHER PUBLICATIONS

Tidewell et al., "Modeling Internet Attacks", Jun. 5-6, 2001, pp. 54-59.

(Continued)

*Primary Examiner* — Jeffrey D Popham
*Assistant Examiner* — Sunita Reddy
(74) *Attorney, Agent, or Firm* — Daly, Crowley, Mofford & Durkee, LLP

(57) ABSTRACT

In one aspect, a method to generate an attack graph includes determining if a potential node provides a first precondition equivalent to one of preconditions provided by a group of preexisting nodes on the attack graph. The group of preexisting nodes includes a first state node, a first vulnerability instance node, a first prerequisite node, and a second state node. The method also includes, if the first precondition is equivalent to one of the preconditions provided by the group of preexisting nodes, coupling a current node to a preexisting node providing the precondition equivalent to the first precondition using a first edge and if the first precondition is not equivalent to one of the preconditions provided by the group of preexisting nodes, generating the potential node as a new node on the attack graph and coupling the new node to the current node using a second edge.

33 Claims, 10 Drawing Sheets

U.S. PATENT DOCUMENTS

| | | | |
|---|---|---|---|
| 6,343,672 | B1 | 2/2002 | Petela et al. |
| 6,836,888 | B1 | 12/2004 | Basu et al. |
| 6,952,779 | B1 | 10/2005 | Cohen et al. |
| 7,013,395 | B1 | 3/2006 | Swiler et al. |
| 7,194,769 | B2 | 3/2007 | Lippman |
| 2002/0123987 | A1* | 9/2002 | Cox ................................ 707/3 |
| 2002/0184504 | A1 | 12/2002 | Hughes |
| 2003/0014669 | A1* | 1/2003 | Caceres et al. ................ 713/201 |
| 2003/0028803 | A1* | 2/2003 | Bunker et al. ................ 713/201 |
| 2003/0046128 | A1* | 3/2003 | Heinrich ............................ 705/7 |
| 2003/0110288 | A1 | 6/2003 | Ramanujan et al. |
| 2003/0149777 | A1 | 8/2003 | Adler |
| 2003/0236995 | A1* | 12/2003 | Fretwell, Jr. ................ 713/200 |
| 2004/0199576 | A1 | 10/2004 | Tan |
| 2005/0138413 | A1 | 6/2005 | Lippman |
| 2005/0149348 | A1* | 7/2005 | Baum-Waidner ................ 705/1 |
| 2005/0193430 | A1* | 9/2005 | Cohen et al. .................... 726/25 |
| 2006/0015943 | A1 | 1/2006 | Mahieu |
| 2006/0021046 | A1* | 1/2006 | Cook .............................. 726/25 |
| 2006/0058062 | A1* | 3/2006 | Bhagwat et al. ........... 455/553.1 |
| 2006/0085858 | A1* | 4/2006 | Noel et al. ...................... 726/25 |
| 2006/0101516 | A1* | 5/2006 | Sudaharan et al. ............. 726/23 |
| 2006/0218640 | A1* | 9/2006 | Lotem et al. .................... 726/25 |
| 2007/0097963 | A1* | 5/2007 | Thermos ....................... 370/352 |
| 2007/0208822 | A1* | 9/2007 | Wang et al. ................... 709/217 |
| 2009/0271863 | A1* | 10/2009 | Govindavajhala et al. ..... 726/23 |

OTHER PUBLICATIONS

Computer-Attack Graph Generation Tool, Laura P. Swiler et al., Sandia National Laboratories, 2001 IEEE, pp. 307-321.

Scalable, Graph-Based Network Vulnerability Analysis, Paul Ammann et al., ACM Nov. 2002, pp. 217-224.

Steffan, Jab et al. "Collaborative Attack Modeling", 2002, pp. 1-10.

IT Guru: Intelligent Network Management for Enterprises (website: www.opnet.com/products/itguru/home.html), 2003 OPNET Technologies, Inc.

IT Guru: Intelligent Network Management for Enterprises, OPNET Technologies, Inc. (website: www.opnet.com), as submitted in an IDS on Mar. 29, 2004 in U.S. Appl. No. 10/734,083, now U.S. Patent 7,194,769.

Attack Trees, Dr. Dobb's Journal Dec. 1999—Modeling Security Threats by Bruce Schneier.

Automated Generation and Analysis of Attack Graphs by Oleg Sheyner, Joshua Haines, Somesh Jha, Richard Lippmann and Jeannette M. Wing, Proceedings of the 2002 IEEE Symposium on Security and Privacy (S&P'02).

NetSPA: A Network Security Planning Architecture by Michael Lyle Artz, S.B., Computer Science and Engineering, Massachusetts Institute of Technology (2001).

Notification of Transmittal of the International Search Report and the Written Opinion of the International Searching Authority, or the Declaration dated Nov. 29, 2004.

Notification of Transmittal of the International Search Report and the Written Opinion of the International Searching Authority, or the Declaration dated Feb. 13, 2008.

Notification Concerning Transmittal of International Preliminary Report on Patentability (Chapter 1 of the Patent Cooperation Treaty), PCT/US2007/013598 dated Dec. 24, 2008.

* cited by examiner

US 7,971,252 B2

GENERATING A MULTIPLE-PREREQUISITE ATTACK GRAPH

RELATED APPLICATIONS

This application claims priority to provisional application Ser. No. 60/804,298, entitled "GENERATING AN ATTACK GRAPH," filed Jun. 9, 2006, which is incorporated herein in its entirety.

GOVERNMENT SPONSORED RESEARCH

This invention was made with government support under grant number F19628-00-C-0002 awarded by the Air Force. The government has certain right in this invention.

BACKGROUND

Large private networks are difficult to secure because of their vulnerability to attacks. One type of attack, a cyber attack, includes an attack by cyber attackers who gain access to the private network from outside of the private network using a public network (e.g., the Internet), for example. Another type of attack includes an inside attack which involves cyber attackers directly connected to the private network. In general, cyber attackers take advantage of vulnerabilities in network protocols and in systems such as servers, desktops, routers, gateways, firewalls and so forth.

In order to prevent these attacks, analysis is performed to determine a network's vulnerabilities so that weaknesses may be addressed. However, analysis of cyber attacks may be difficult because compromising one device in a network often provides a stepping-stone that may be used to launch further attacks. For example, a cyber attacker may jump from one device to another device, eventually achieving one or more goals (e.g., compromising an e-mail server). One type of analysis for security assessment is to determine the level of compromise possible for hosts in a network from a given attacker starting location. One type of analysis tool used in this security assessment is an attack graph.

SUMMARY

In one aspect, a method to generate an attack graph includes determining if a potential node provides a first precondition equivalent to one of preconditions provided by a group of preexisting nodes on the attack graph. The group of preexisting nodes includes a first state node, a first vulnerability instance node and a first prerequisite node. The method also includes, if the first precondition is equivalent to one of the preconditions provided by the group of preexisting nodes, coupling a current node on the attack graph to a preexisting node providing the precondition equivalent to the first precondition using a first edge. The method further includes, if the first precondition is not equivalent to one of the preconditions provided by the group of preexisting nodes, generating the potential node as a new node on the attack graph and coupling the new node to the current node using a second edge.

In another aspect, a multiple-prerequisite attack graph includes a first state node corresponding to access to a first host in a network. The first host is a starting point of a cyber attack on the network. The graph also includes a first prerequisite node coupled to the first state node by a first edge, and a first vulnerability instance node coupled to the first prerequisite node by a second edge and coupled to a second state node by a third edge. The second state node corresponds to access to a second host in the network. The first vulnerability instance node corresponds to a vulnerability instance on a vulnerable port on the second host. The graph further includes a current node coupled to one of a group of preexisting nodes by a fourth edge. The one of a group of preexisting nodes satisfies a precondition equivalent to a precondition provided by a potential node. The group of preexisting nodes includes the first state node, the first vulnerability instance node, the first prerequisite node, and the second state node.

Various other aspects directed to generation of an attack graph include a method, an article and an apparatus, for example. The aspects include one or more of the following. For example, the aspects may include selecting a first state node as a starting point of a cyber attack. The first state node corresponds to access to a first host in a network. The aspects include coupling the first state node to a first prerequisite node having a first precondition satisfied by the first state node using a first edge, coupling the first prerequisite node to a first vulnerability instance node having a second precondition satisfied by the first prerequisite node using a second edge and coupling the first vulnerability instance node to a second state node having a third precondition satisfied by the first vulnerability instance node using a third edge. The aspects further include determining if a potential node, having a fourth precondition satisfied by a current node on the attack graph, provides a fifth precondition equivalent to one of preconditions provided by a group of preexisting nodes. The group of preexisting nodes includes the first state node, the first vulnerability instance node, the first prerequisite node and the second state node. The aspects further include, if the fifth precondition is equivalent to one of the preconditions provided by the group of preexisting nodes, coupling the current node to a preexisting node providing the precondition equivalent to the fifth precondition using a fourth edge. The aspects also include, if the fifth precondition is not equivalent to one of the preconditions provided by the group of preexisting nodes, generating the potential node as a new node on the attack graph and coupling the new node to the current node using a fifth edge.

DETAILED DESCRIPTION

Figure 1:
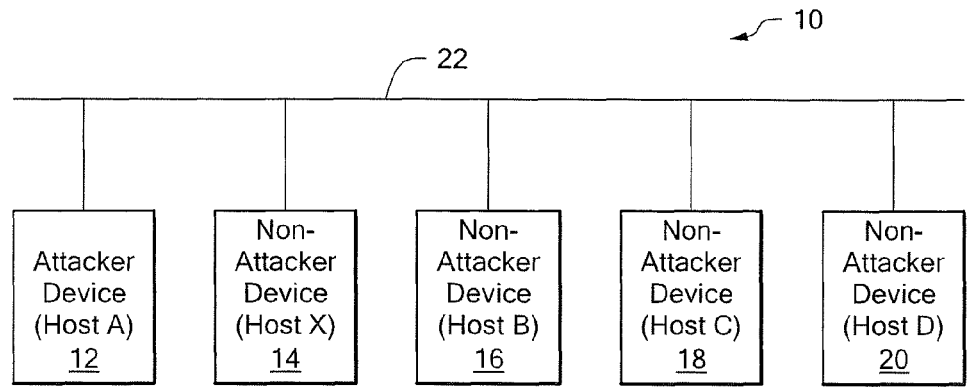
FIG. 1 is a diagram of an example of a network system.

Referring to FIG. 1, an example of a network system 10 includes an attacker device 12 (also referred to as a host A) connected by a network 22 to non-attacker devices, for example, a non-attacker device 14 (also referred to as a host X), a non-attacker device 16 (also referred to as a host B), a non-attacker device 18 (also referred to as a host C) and a non-attacker device 20 (also referred to as a host D). The attacker device 12 corresponds to a starting point of an attack by an attacker. The non-attacker devices 14, 16, 18, 20 correspond to devices not exploited initially by this attacker. As used herein, a host corresponds to any device on the network capable of filtering, modifying, or accepting network traffic. For example, a host may include routers, firewalls, desktop computers, server/rackmount computers, laptop computers and so forth.

As used herein, a vulnerability represents a flaw in a computer program, or a misconfiguration in a computer program, or some other property of a program which allows an attacker to perform unauthorized or unintended actions. A vulnerability has a specified locality (remote or local), indicating whether or not it can be exploited remotely from another host, and a specified effect (e.g., user access, root access, other access, denial of service (DoS) access) indicating the access level gained by exploiting it, for example, a specific buffer overflow in a web server providing remote-to-root access. The "root" access provides administrative privileges on a host. The "user" access provides privileges of a normal user. The "other" access provides limited access to information stored on the host or to limited host capabilities. The "DoS" access allows no access to the host but allows an attacker to prevent access to the host. In one example, vulnerabilities may include additional properties, for example, the difficulty of exploitation.

In one example, the non-attacker device 14 has root privileges to non-attacker devices 16, 18, 20 which correspond to user desktops. Each non-attack host (the host X, the host B, the host C and the host D) has one remote-to-root vulnerability that can be exploited from any other host (referred to hereinafter as a "vulnerability 1") to provide root privileges. The devices 16, 18, 20 (the host B, the host C and the host D) have another remote-to-root vulnerability that is exploited by someone with root privileges on the host X (referred to hereinafter as a "vulnerability 2"). Attack graphs for determining hosts that can be compromised on the network 22 by the attacker device 12 may be constructed, for example, as shown in FIGS. 2A to 2C.

Figure 2A:
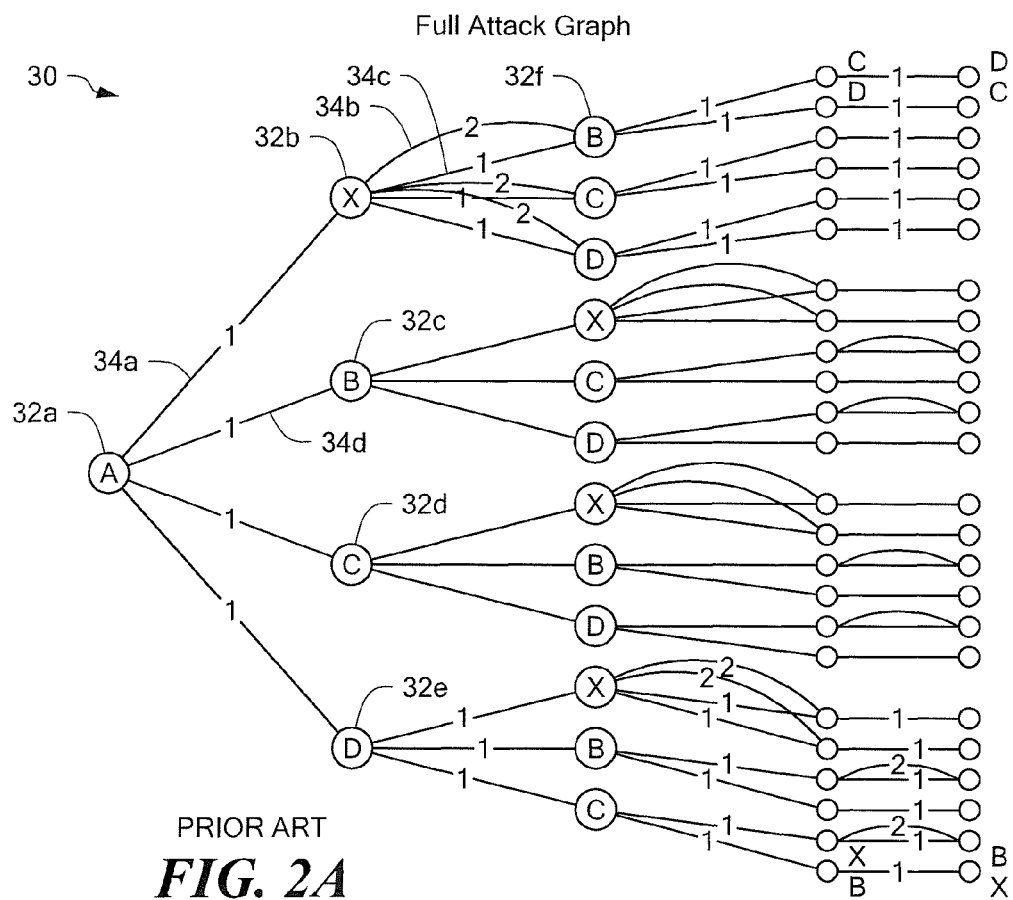
FIGS. 2A to 2C are prior art diagrams of examples of attack graphs of the network system of FIG. 1.

Referring to FIG. 2A, a full attack graph 30 shows all possible paths or sequences of compromised hosts and vulnerabilities that the attacker device 12 can use to compromise all hosts in the network system 10. Nodes (e.g., a node 32a, a node 32b, a node 32c, a node 32d, a node 32e and a node 32f) correspond to states. A state is a combination of a host and an access level. The access level may be a root access, the user access, the "other" access and a denial of service (DoS) access as described above. In the examples shown in the figures described herein, the nodes correspond to root access to a host as an example, but the nodes may be other types of nodes, for example, nodes corresponding to user access.

Figure 2B:
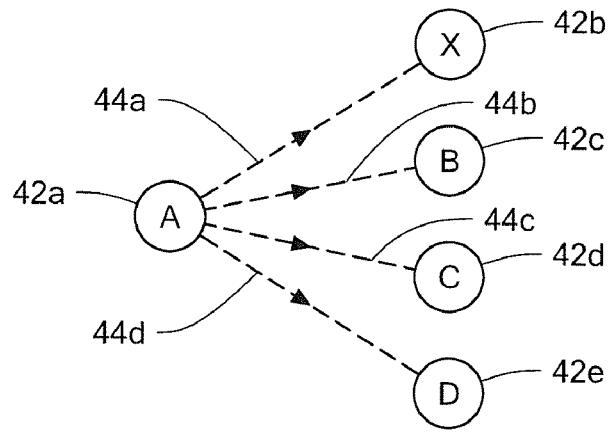
Figure 2C:
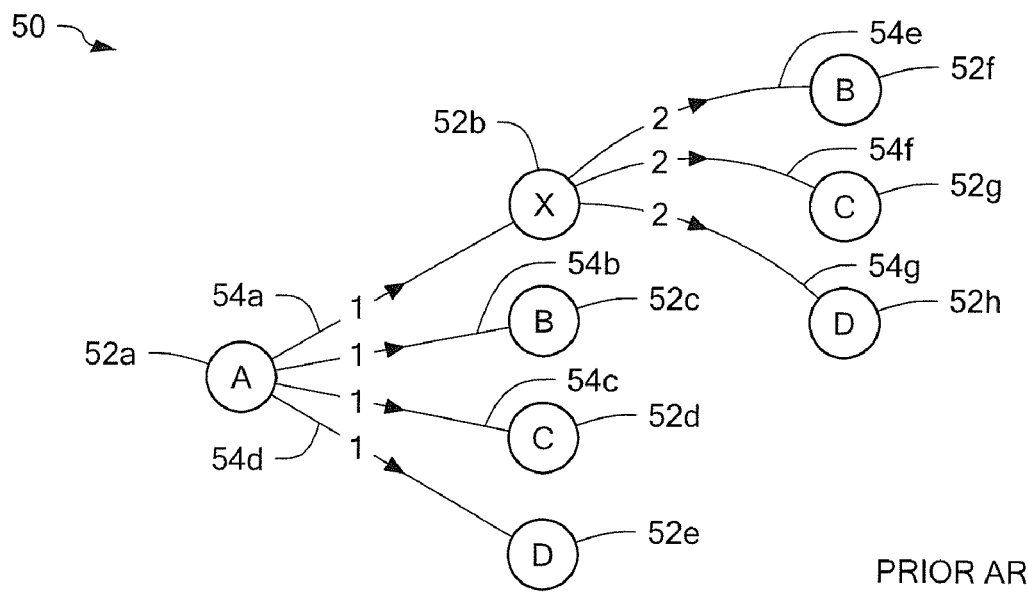

The notation used in the attack graphs for FIGS. 2A-2C includes nodes depicted by a circle with a letter within the circle or next to the circle corresponding to the host. For example, nodes 32a-32f correspond to root access to a host (e.g., the node 32a corresponds to root access to host A (the attacker device 12), the node 32b corresponds to root access to host X (the non-attacker device 14), the node 32c and the node 32f correspond to root access to the host B (the non-attacker device 16), the node 32d corresponds to root access to the host C (the non-attacker device 18), the node 32e corresponds to root access to the host D (the non-attacker device 20)).

Edges are shown as lines numbered with either a "1" or "2" to correspond to a vulnerability 1 and a vulnerability 2, respectively. Edges (e.g., an edge 34a, an edge 34b, an edge 34c and the edge 34d) connect nodes on the full attack graph 30 and correspond to vulnerability instances used to compromise hosts. For example, the edge 34a, the edge 34c and the edge 34d correspond to the vulnerability 1 on a port on the targeted host and the edge 34b corresponds to the vulnerability 2 on a port on the targeted host. For simplicity of description, not all of the nodes in FIG. 2A include letters nor is each edge labeled with a "1" or a "2."

The attacker at host A starts at the node 32a, and the paths shown represent all possible sequences of attacker actions that compromise as many hosts as possible. For example, there are a finite number of paths to access a node representing the host B from the node 32a (the attacker). For example, the host B may be attacked directly through a vulnerability 1 as shown in the full attack graph 30 by the node 32a connected to the node 32c by the edge 34d. In another example, the host B may also be attacked through a vulnerability 1 with the host X (i.e., the node 32a and the node 32b are connected by the edge 34a) and a vulnerability 2 from host X (i.e., the node 32b and the node 32f are connected by the edge 34b). In a further example, the host B may further be attacked through a vulnerability 1 with the host X (i.e., the node 32a and the node 32b are connected by the edge 34a) and a vulnerability 1 from the host X (i.e., the node 32b and the node 32f connected by the edge 34c).

Whenever there are multiple vulnerability instances that can be used to compromise a host, a separate edge is drawn for each vulnerability instance. For example, there are two edges (the edge 34b and the edge 34c) from node 32b (corresponding to the host X) to node 32f (corresponding to the host B) because host B may be compromised with either of two different vulnerabilities (the vulnerability 1 and the vulnerability 2) from the host X.

It is impractical to generate a full attack graph (e.g., the full attack graph 30 FIG. 2A) even for small networks. For the network system 10 shown in FIG. 1, the number of nodes in the full attack graph (and the computational requirements to process the attack graph) grows factorially (e.g., $O(H!)$ in Big O notation), where H is the number of non-attacker hosts in the network. In one example, in a subnetwork with only 10 hosts, the attack graph would include more than three million nodes. With 10 hosts in the network, one additional host increases the attack graph size and computation requirements by an order of magnitude.

FIG. 2B includes an example of a host-compromised attack graph 40 for the network system 10 (FIG. 1). The host-compromised attack graph 40 may also be called a shortest-path attack graph because it only shows one shortest path to each compromised host. Nodes (e.g., a node 42a, a node 42b, a node 42c, a node 42d and a node 42e) in the host-compromised graph 40 correspond to states (e.g., the node 42a corresponds to root access to the host A (the attacker 12), the node 42b corresponds to root access to the host X (the system administrator 14), the node 42c corresponds to root access to the host B (the user desktop 16), the node 42d corresponds to root access to the host C (the user desktop 18), the node 42e corresponds to root access to the host D (the user desktop 20)) that can be compromised by the attacker A and the level of privilege gained. Edges (e.g., an edge 44a, an edge 44b, an edge 44c and an edge 44d) indicate one of potentially many exploitable vulnerabilities (e.g., the vulnerability 1 and the vulnerability 2) that can lead to a compromise of the connected host.

The maximum number of nodes on a host-compromised graph with only remote-to-root attacks is the number of hosts in the network. For example, the network 22 includes five hosts (the host A, the host B, the host C, the host D and the host X) so that the maximum number of nodes in the host-compromised attack graph 40 is five (the node 42a, the node 42b, the node 42c, the node 42d and the node 42e). An upper bound on the computation required to generate a host-compromised graph assuming reachability has already been computed between all host pairs is $O(H^2)$ in Big O notation, for example. This follows from the maximum number of nodes in the graph, O(H), times the maximum number of hosts that are reachable, H. The computation required to search the current graph and determine if a host is already on the graph can be performed in constant time (for example, O(I) in Big O notation) using a lookup table with a bit for each host indicating whether it is or is not already on the graph.

The host-compromised attack graph 40 indicates the hosts that can be compromised and provides a single path to each host that can be compromised. The host-compromised attack graph 40 in FIG. 2B has a depth of one (i.e., the attacker device 12 (host A) is directly connected to all non-attacker devices 14, 16, 18, 20 (hosts X, B, C and D)); however, in other examples, the host-compromised attack graph may have greater depth (i.e., the attacker device 12 is connected to a non-attacker device through one or more other non-attacker devices).

The host-compromised attack graph 40 only shows the shortest path to compromise a host that can be compromised and does not include alternate paths available to attackers. Because of this, a single host-compromised graph cannot be used to determine whether eliminating a vulnerability instance prevents compromise or whether there are other ways to compromise hosts. Testing any single hypothesis requires rebuilding the entire host-compromised graph.

The host-compromised attack graph 40 provides little insight into networks because it only shows a shortest path to each host. Determining the effect of patching vulnerabilities or adding firewall rules requires regenerating the host-compromised attack graph because there may be many paths to hosts. On the other hand, the full attack graph 30 provides more information about the effect of vulnerabilities, but it has redundant structure and is impractical for all but the smallest networks.

FIG. 2C shows a predictive attack graph 50 for the network of FIG. 1 that depicts the same predictive characteristics as the full attack graph 30 but with less computational time and memory. In general, the predictive attack graph 50 determines all hosts that can be compromised by an attacker from a given starting location. Without regenerating the predictive attack graph 50, the predictive attack graph correctly predicts the effect of preventing the attacker from exploiting vulnerabilities. The prevention may be undertaken in many different ways. For example, the vulnerable software may be patched, upgraded, or uninstalled. In another example, a firewall may be used to prevent the attacker from reaching the vulnerable software. One of ordinary skill in the art may implement other methods.

As in the full attack graph 30 (FIG. 2A), nodes in the predictive attack graph 50 (e.g., a node 52a, a node 52b, a node 52c, a node 52d, a node 52e, a node 52f, a node 52g and a node 52h) represent states (e.g., the node 52a corresponds to root access to host A (the attacker 12), the node 52b corresponds to root access to the host X (the system administrator 14), the node 52c and the node 52f correspond to root access to the host B (the user desktop 16), the node 52d and the node 52g correspond to root access to the host C (the user desktop 18), the node 52e and the node 52h correspond to root access to the host D (the user desktop 20)) in the network 22 (FIG. 1) which the attacker has compromised. The edges (e.g., an edge 54a, an edge 54b, an edge 54c, an edge 54d, an edge 54e, an edge 54f and an edge 54g) correspond to vulnerability instances the attacker could use to achieve the compromise (e.g. the edge 54a corresponds to vulnerability 1 on host X (the system administrator 14), the edge 54b corresponds to vulnerability 1 on host B (the user desktop 16), the edge 54c corresponds to vulnerability 1 on host C (the user desktop 18), the edge 54d corresponds to vulnerability 1 on host D (the user desktop 20), the edge 54e corresponds to vulnerability 2 on host B (the user desktop 16), the edge 54f corresponds to vulnerability 2 on host C (the user desktop 18), and the edge 54g corresponds to vulnerability 2 on host D (the user desktop 20)).

However, unlike the full attack graph 30, in the predictive attack graph 50, all of the redundant paths have been removed. The remaining structure fulfills the predictive requirement. Each edge 54a-54g in the predictive attack graph 50 corresponds to a specific vulnerability instance and each node 52a-52h corresponds to a state. The effect of removing vulnerabilities and adding firewall rules to prevent exploitation can be determined using the predictive attack graph 50 by removing the associated edges from that graph. An example of generating a predictive attack graph is described in U.S. Pat. No. 7,194,769, entitled "Network Security Planning Architecture," which is incorporated herein in its entirety and is assigned to the same entity as this patent application. However, even the predictive attack graph 50 becomes cumbersome to generate for large numbers of hosts and vulnerabilities and certain common network configurations.

Figure 3:
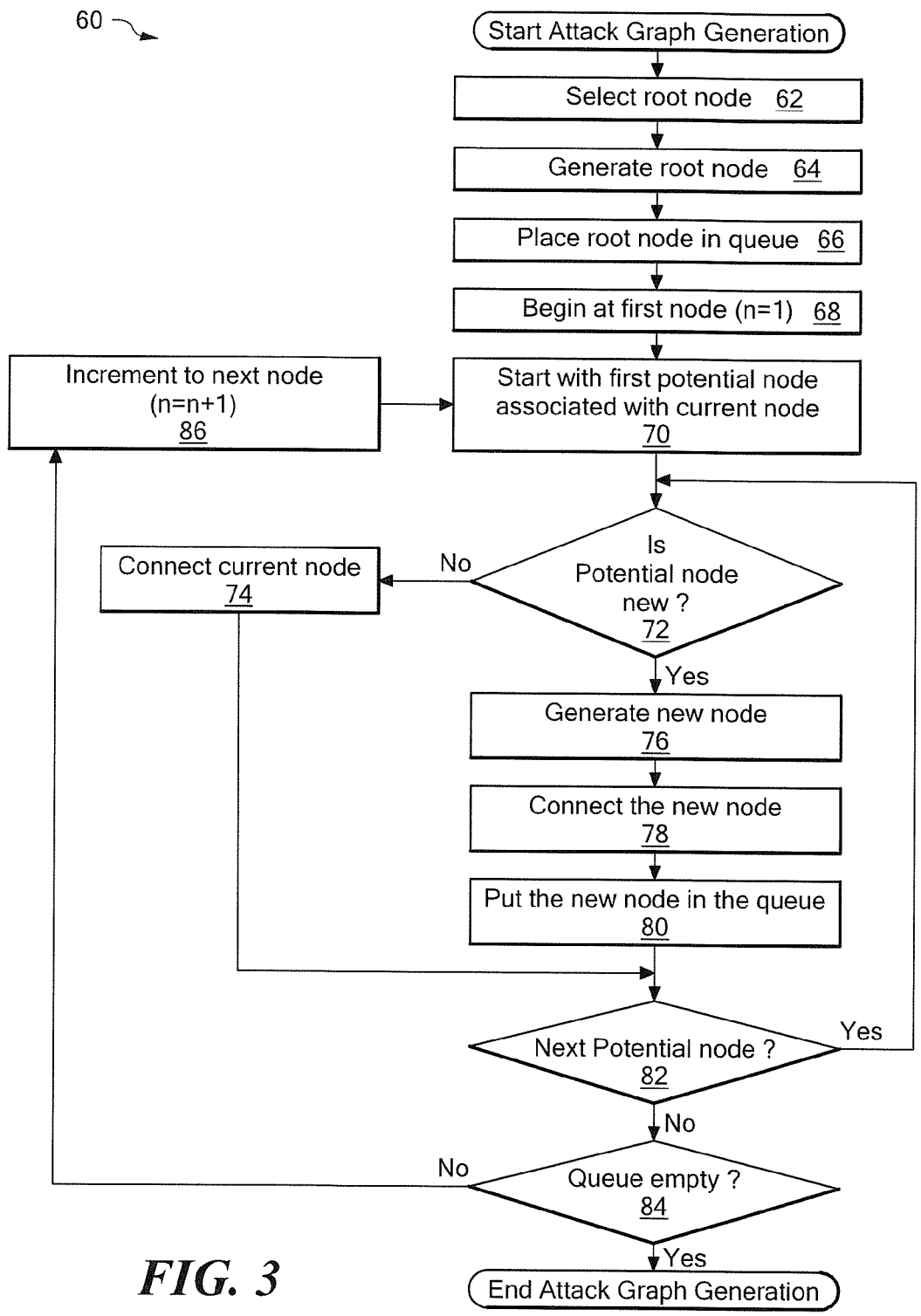
FIG. 3 is a flowchart of an example of a process to generate a multiple-prerequisite attack graph.

In contrast to the previous attempts to generate attack graphs, described herein is a process for generating a multiple-prerequisite attack graph that includes all of the information included in a full attack graph (e.g., the attack graph 30 in FIG. 2A) without generating the full attack graph itself. An example of a process to generate a multiple-prerequisite attack graph 100a (FIG. 4A) is a process 60 (FIG. 3). As will be described below, the process 60 generates directed edges (connections between nodes) that are contentless. For example, unlike the previous approaches where edges corresponded to a vulnerability instance (e.g., a vulnerability instance 1 and a vulnerability instance 2), the edges used in generating a multiple-prerequisite attack graph merely represent a connection between two nodes in the graph. The process 60 further generates different types of nodes than just state nodes.

Figure 4A:
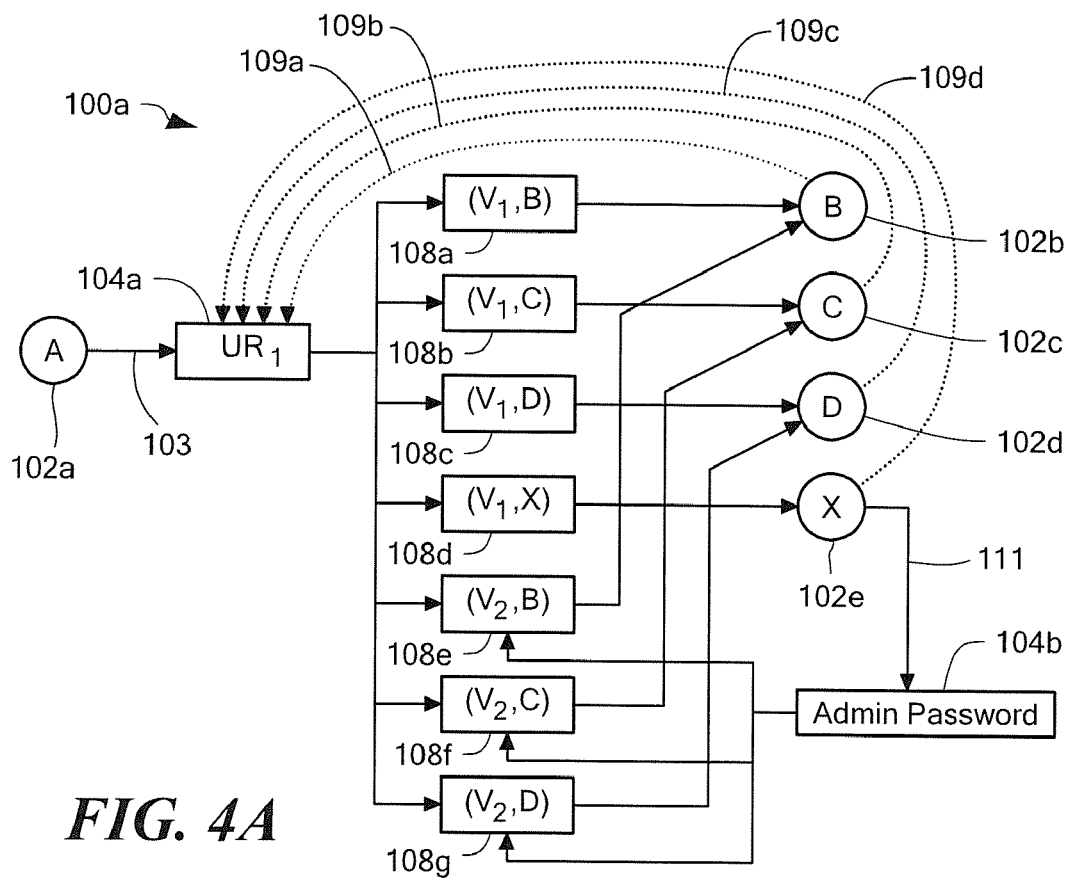
FIG. 4A is a completely generated multiple-prerequisite attack graph using the process of FIG. 3.

Referring to FIGS. 3 and 4A, an exemplary process 60 may be used to generate the multiple-prerequisite attack graph 100a for the network system 10 (FIG. 1). Before describing the generation of the multiple-prerequisite attack graph 100a, the nodes in the multiple-prerequisite attack graph 100a are defined to facilitate the description of process 60. As indicated above, the multiple-prerequisite attack graph 100a includes nodes that represent more than just state nodes. A node in the multiple-prerequisite attack graph 100a may correspond to one of a state node, a prerequisite node or a vulnerability instance node.

A state node represents a level of access on a host, similar to state nodes in the previous graph types. For example, a state node 102a corresponds to root access to the host A, a state node 102b corresponds to root access to the host B, a state node 102c corresponds to root access to a host C, a state node 102d corresponds to root access to a host D and a state node 102e corresponds to root access to a host X. A state node points to zero or more prerequisite nodes. In one example (not shown), a state node may represent new higher-level privileges on a host already represented on the attack graph 100a by another state node.

A prerequisite node represents a prerequisite required to exploit a vulnerability instance node. For example, the prerequisite node may represent a prerequisite such as a reachability group or a credential. A reachability group is a set of interfaces which possess the same outbound reachability, i.e., they are able to reach the same ports. An interface can belong to zero or more reachability groups; a port may be reached by zero or more reachability groups. A host may have one or more interfaces. In one example, there are two types of reachability groups—an "unfiltered" group, representing traffic between an interface and a port which have no filtering/routing devices between each other, and a "filtered" group, representing traffic between an interface and a port which must traverse at least one host (acting as a firewall, for example). Each interface belongs to one unfiltered group and one filtered group. Other examples may use more types of reachability groups, divided in different ways. Other examples may also have each interface belong to more or fewer groups. A prerequisite node points to zero or more state nodes.

For example, a prerequisite node 104a provides reachability to vulnerable ports on the host X, the host B, the host C and the host D. The prerequisite node 104a may be a filtered reachability group or an unfiltered reachability group.

As used herein a port represents both a piece of software and the particular means (port number) by which that software can be contacted on the network. In other embodiments, a port may represent only the means (port number) by which an exposed vulnerability can be exploited. A port belongs to exactly one interface and an interface can have zero or more ports.

As used herein an interface represents a particular path of ingress/egress belonging to a host. An interface is connected to exactly one link.

As used herein a link represents any wire, device, or other medium used to connect multiple interfaces together such as wireless access points, hubs and non-filtering switches, for example.

In another example, the prerequisite node 104b provides a credential (e.g., a password, a passphrase and so forth) required to access vulnerable ports on the host B, the host C and the host D. For example, some vulnerability instances require reachability and one or more credentials. As will be shown below, prerequisite 104a and prerequisite 104b together provide additional vulnerability instances. A credential represents any sort of portable prerequisite an attacker could obtain and use to affect further compromise. In one example, a specific effect obtained on a specific host can provide zero or more credentials, and a specific vulnerability instance can require zero or more credentials.

The vulnerability instance node indicates the presence of a vulnerability on a port. The vulnerabilties on the vulnerable ports are shown by the vulnerability instance nodes 108 (FIG. 4A). The vulnerability instance nodes 108 include, a vulnerability instance node ($V_1$, B) 108a, a vulnerability instance node ($V_1$, C) 108b, a vulnerability instance ($V_1$, D) 108c, a vulnerability instance node ($V_1$, X) 108d, a vulnerability instance node (V2, B) 108e, a vulnerability instance node (V2, C) 108f and a vulnerability instance (V2, D) 108g. For example, the vulnerability instance node ($V_1$, B) 108a indicates that a port at host B has vulnerability 1, the vulnerability instance node ($V_1$, C) 108b indicates that a port at host C has vulnerability 1, the vulnerability instance node ($V_1$, D) 108c indicates that a port at host D has vulnerability 1, the vulnerability instance node ($V_1$, X) 108d indicates that a port at host X has vulnerability 1, the vulnerability instance node ($V_2$, B) 108e indicates that a port at host B has vulnerability 2, the vulnerability instance node ($V_2$, C) 108f indicates that a port at host C has vulnerability 2 and the vulnerability instance node ($V_2$, D) 108g indicates that a port at host D has vulnerability 2. For simplicity of description, specific port numbers on the hosts (e.g., port 80/TCP (Transmission Control Protocol)) are omitted. A vulnerability instance node points to exactly one state node.

Referring back to FIG. 3 and turning to a description of process 60, process 60 selects a state node as a starting point of an attacker attack (i.e., a root node) (62). For example, the multiple-prerequisite attack graph 100 includes the state node 102a representing a starting point of attack by attacker A and further represents access to the host A. In other examples, process 60 may select more than one node for an attack. For example, an attacker may launch an attack from more than one host. In another example, multiple attackers may use multiple hosts to launch an attack. In a still further example, process 60 may use every host in the network 22 as a starting point of an attack. In one example, a user selects a starting state or states. In another example, the user may select all root states and all the attacker starting locations. In a still further example, a computer program or other tool selects the starting root state or states.

Process 60 generates a root node or nodes on the attack graph (64). For example, the state node 102a is generated on the multiple-prerequisite attack graph 100a. Process 60 places the root node or nodes into a queue (66). As will be described below, the queue includes all nodes that have not been processed using process 60. Initially, the queue contains one or more root nodes. In this example, the queue contains the node 102a (FIG. 4A). The queue is used by process 60 in a first-in-first-out (FIFO) manner. In other examples, the queue may be used in a last-in-first-out (LIFO) manner. In further examples, the queue may be a priority queue where each type of node is prioritized. For example, state nodes could be prioritized by the relative importance of the underlying hosts. In another example, vulnerability instance nodes could be prioritized based on the expected difficulty of exploiting the vulnerabilities. In other examples, a stack or any type of data store may be used instead of the queue. In still further examples, nodes may be randomly selected from the queue.

Process 60 begins at the first node (n=1) in the queue (68). For example, process 60 begins with the state node 102a. Process 60 starts with a first potential node associated with the node (70). Potential nodes are processed one at a time to determine whether each potential node will or will not become a node in the multiple prerequisite attack graph 100a. The type of node determines the potential node associated with the node. For example, if the node is a state node, then a potential node may be a prerequisite provided by that state. For example, root level access to Host X, represented by node 102e, provides the reachability prerequisite 104a and the administrative password prerequisite 104b.

If the node is a prerequisite node that is a reachability group, then the potential node is from the vulnerability instances that the reachability group can reach (i.e., the instances of the reachable ports) less those requiring credentials not yet on the graph. If the node is a prerequisite node that is a credential, then a potential node is from the vulnerability instances that require the credential less those vulnerability instances which have not been reached by any previous reachability group, less those requiring additional credentials not yet on the graph.

If the node is a vulnerability instance node, then a potential node is the state node that the attacker may obtain by exploiting the vulnerability instance.

In this example, process 60 starts with the prerequisite associated with the root node 102*a*. Process 60 determines if the potential node is already represented as a node (72). For example, the process 60 determines if there is a prerequisite node representing the prerequisite.

If process 60 determines that there is not a node representing the potential node, process 60 generates a new node (76). For example, process 60 generates the prerequisite node 104*a*. Process 60 connects the new node (78). For example, the process 60 connects the root node 102*a* to the prerequisite node 104*a* with an edge 103. Process 60 puts the new node into the queue (80). For example, a value representing the prerequisite node 104*a* is placed in the queue for later processing by process 60.

If process 60 determines that there is already a node representing the potential node, process 60 connects the current node to the existing node corresponding to the potential node (74). For example, after constructing most of the multiple-prerequisite attack graph 100*a*, the state node 102*b* is the current node. Process 60 determines that the prerequisite associated with the state node 102*b* is the same as a preexisting prerequisite node on the multiple-prerequisite attack graph 100*a*, the prerequisite node 104*a*. Process 60 connects the state node 102*b* to the prerequisite node 104*a* using an edge 109*a*. Likewise, process 60 determines (72) that the remaining state nodes have prerequisites represented by the prerequisite node 104*a* and connects the state nodes 102*b*-102*e* to the prerequisite 104*a*. For example, the state node 102*c* is connected to the prerequisite node 104*a* using an edge 109*b*, the state node 102*d* is connected to the prerequisite node 104*a* using an edge 109*c* and the state node 102*e* is connected to the prerequisite node 104*a* using an edge 109*d*.

The "loop-back" of the edges 109*a*-109*d* to the prerequisite node 104*a* is one example of the multiple-prerequisite attack graph providing recurrency without generating redundant nodes. The reachability node 104*a* also summarizes reachability available to many hosts on a subnet. Thus, multiple-prerequisite graphs efficiently represent large complex networks better than previous attack graphs. For example, the full attack graph (e.g., the full attack graph 30 (FIG. 2A)) does not include recurrent edges (e.g., edges like edges 109*a*-109*d* that loop back) and is not often used because it can grow combinatorially as nodes are added to a network. In another example, the predictive attack graph (e.g., the predictive attack graph 50, (FIG. 2C)) does not include recurrent edges, but may include unnecessary repeated structure (e.g., redundant nodes) when there are multiple layers of filtering devices such as firewalls and when multiple hosts can be compromised through these devices.

Figure 4B:
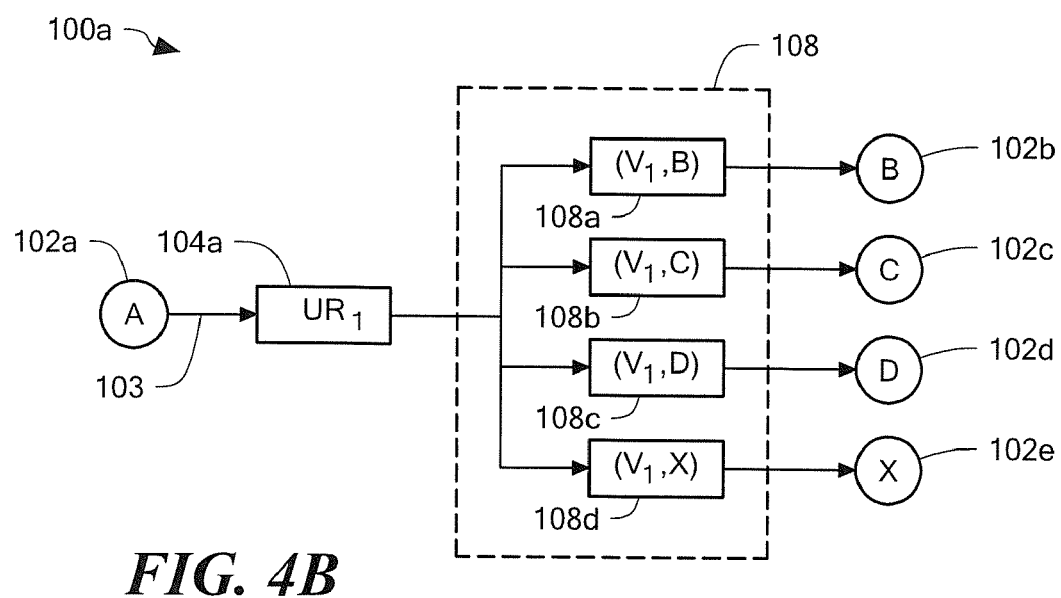
FIG. 4B is a partially generated multiple-prerequisite attack graph.

Process 60 determines if there are other potential nodes associated with the current node (82). If there is a next potential node, process 60 determines if the potential nodes new (72). If there is not a next potential node, process 60 determines if the queue is empty (84). If the queue is empty, the process 60 ends. If the queue is not empty, process 60 increments to the next node (n=n+1) (86). After the state node 102*a* is evaluated the prerequisite node 104*a* is processed next in this example. For example, process 60 evaluates the potential nodes associated with the prerequisite 104*a*, which are the vulnerability instances, determines the new potential nodes (74), and generates a subset 108' of the total vulnerability instance nodes 108 reachable from the prerequisite node, as shown in FIG. 4B depicting a partially constructed multiple-prerequisite attack graph 110*b*. For example, process 60 generates (76) and connects (78) vulnerability instance nodes 108*a*-108*d*. For example, the prerequisite node 104*a* is connected to the vulnerability instance nodes 108*a*-108*d*. The vulnerability instance nodes 108*e*-108*g* are not generated at this point in process 60 (and therefore not shown in FIG. 4B) because these vulnerability instances require the prerequisite 104*b*.

Referring back to FIGS. 3 and 4A, after process 60 generates the vulnerability instance nodes 108*a*-108*d* on the multiple-prerequisite attack tree 100*a*, process 60 evaluates the potential nodes associated with vulnerability instance nodes 108*a*-108*d*. Process 60 determines (72) that the corresponding state for each vulnerability instance 108*a*-108*d* is a new node and generates (76) the state nodes 102*b*-102*e*. Process 60 connects (78) the corresponding state nodes 102*b*-102*e*. For example, the vulnerability instance node ($V_1$, B) 108*a* is connected to the state node 102*b*, the vulnerability instance node ($V_1$, C) 108*b* is connected to the state node 102*c*, the vulnerability instance ($V_1$, D) 108*c* is connected to the state node 102*d* and the vulnerability instance node ($V_1$, X) 108*d* is connected to the state node 102*e*.

When the state node 102*e* becomes the current node, process 60 determines (72) that one of its associated potential nodes, a credential (e.g. an administrator's password), requires a new node. Process 60 generates (76) the prerequisite node 104*b* and connects (78) the state node 102*e* to the prerequisite 104*b* by an edge 111. Process 60 then puts the new prerequisite node into the queue (80). When the prerequisite node 104*b* becomes the current node, process 60 generates (76) and connects (78) the vulnerability instance nodes 108*e*-108*g* not previously accessible even though reachable.

The process 60 ensures that a node is placed on the multiple-prerequisite attack graph 100*a* when its preconditions are completely satisfied. For example, the vulnerability instance nodes 108*e*-108*g* were not included in the attack graph 100*a* until all the required prerequisites 104*a*-104*b* were accessed. Further, process 60 analyzes a node just once.

Process 60 utilizes reachability groups. However, it is possible to build a multiple prerequisite graph without reachability groups. Instead of a reachability group prerequisite, the graph would generate a prerequisite representing reachability to a specific port. In other words, a state node capable of reaching 100 ports would have outbound edges to 100 separate prerequisite nodes, each representing the ability to reach a single port. In this embodiment, process 60 would instead have outbound edges to two reachability groups, one unfiltered and one filtered, which together comprise the 100 reachable ports.

Reachability groups may be derived by determining a reachability matrix (for example, a reachability matrix 300 described below in FIGS. 6A-6D). The reachability matrix has been used for simple hand-generated networks. Although this is complete and correct in principle, it rapidly becomes a performance bottleneck as the size of the network increases. For example, if H is the number of hosts in a network and P is the maximum number of inbound TCP and UDP ports or services per host, then the size of the matrix is bounded by $H^2P$. In a network with 1000 hosts with 20 TCP polts maximum, this can require 20 million complex reachability analyses. Each analysis involves an examination of firewall or router rules, and if there are R total rules across all filtering devices, the computation required is bounded by $H^2PR$ operations. Complex cases which offer multiple physical paths between two hosts and degenerate cases which loop traffic back through filtering devices multiple times may perform even worse than $H^2PR$; in both cases, rules may be considered multiple times for a given reachability calculation.

Figure 5:
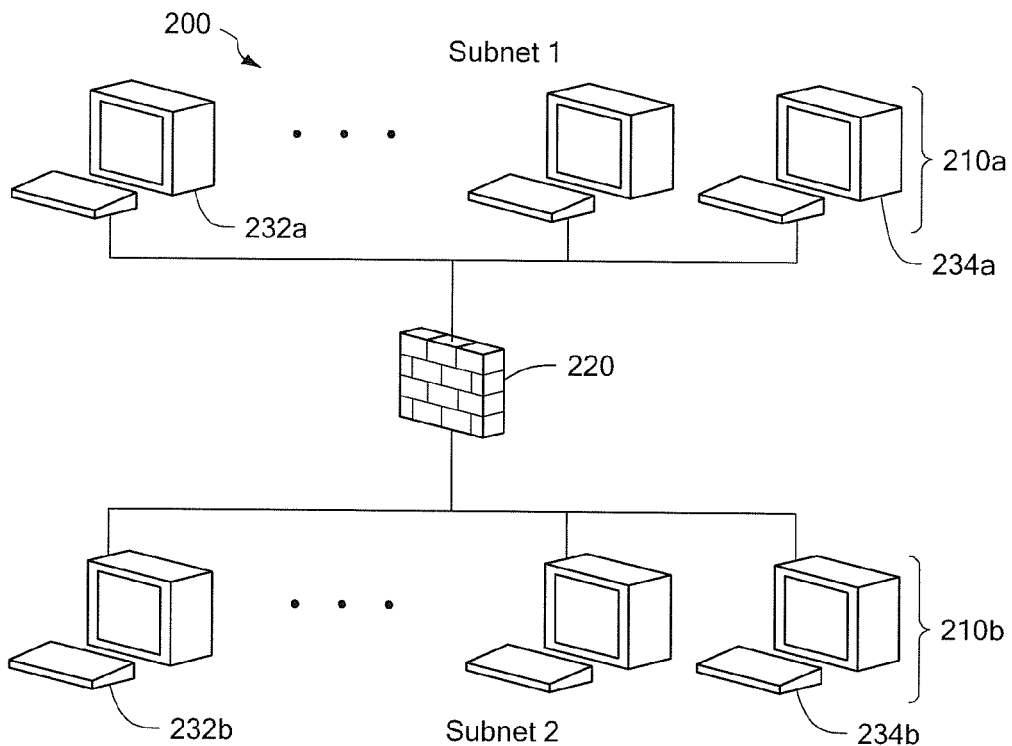
FIG. 5 is a diagram of a network.

For example, reachability groups may be generated from a network 200 in FIG. 5 using a reachability matrix. The network 200 includes two subnets (e.g., a first subnetwork 210a and a second subnetwork 210b) separated by a firewall 220. The first subnetwork 210a includes a host 232a and a host 234a and the second subnetwork 210 includes a host 232b and a host 234b.

Figure 6A:
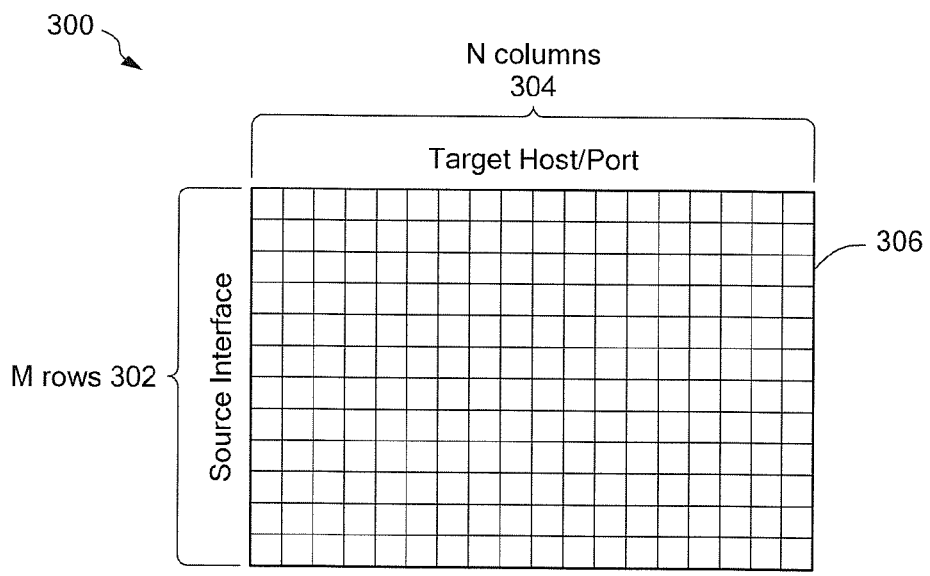
FIGS. 6A to 6D are representations of a reachability matrix.

Referring to FIG. 6A, a reachability matrix 300 for the network 200 includes rows 302 (e.g. a total of M rows), each row in the matrix 300 indicating a source interface in the network 200, and columns 304 (e.g., a total of N columns), each column indicating a destination port in the network 200. Each cell (e.g., a cell 306) of the matrix potentially holds a Boolean value, indicating whether or not reachability exists between the source interface and the destination pot. As will be shown in FIGS. 6B-6D, the reachability matrix may be further simplified.

Figure 6B:
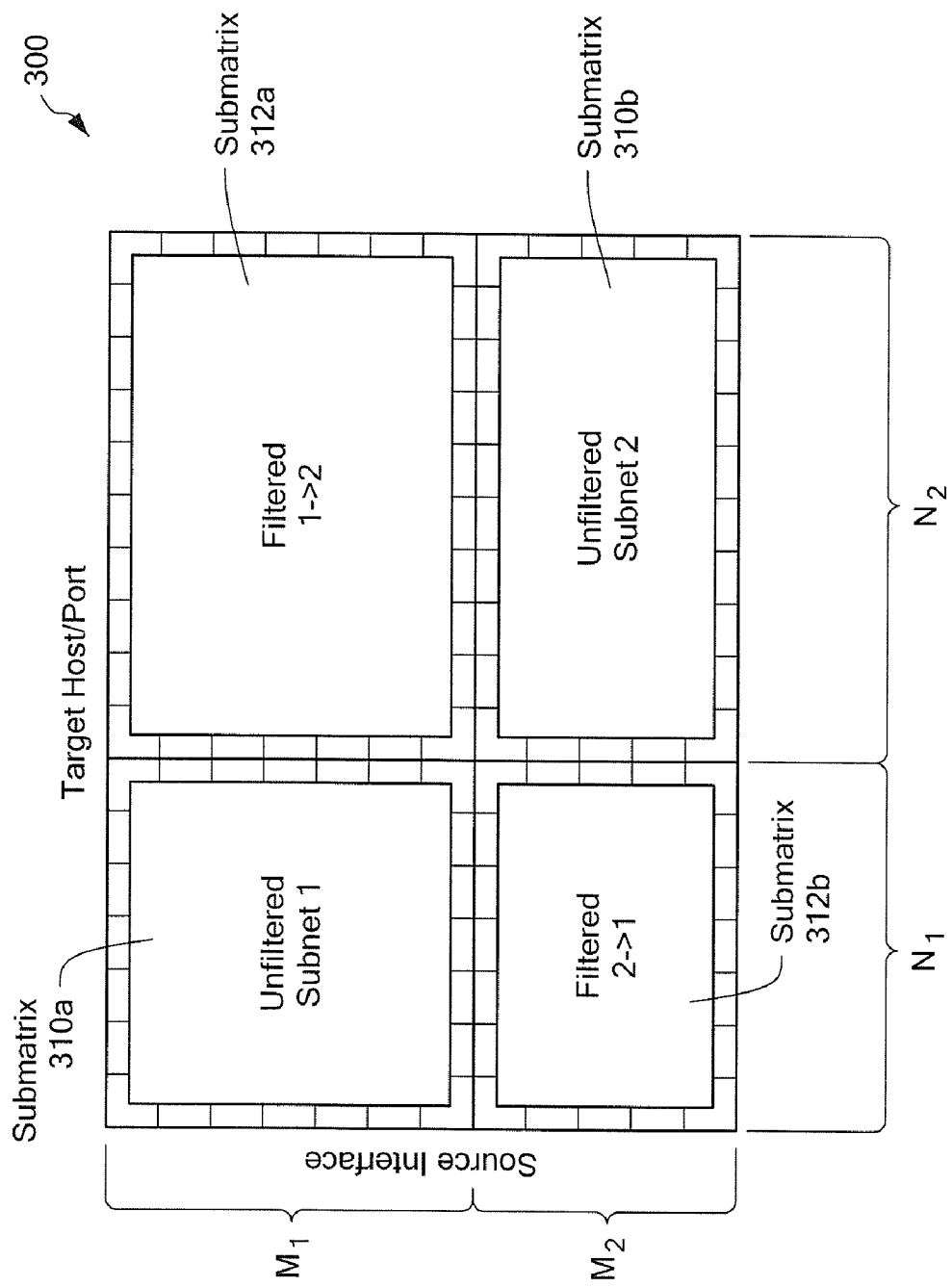

The reachability matrix 300 of FIG. 6B may include four components (e.g., intra-subnetwork submatrices 310a, 310b, and inter-subnetwork submatrices 312a, 312b). Intra-subnetwork submatrices 310a, 310b include reachability which does not cross any filtering device on the network, while inter-subnetwork submatrices 312a, 312b include reachability which crosses at least one filtering device. The intra-subnetwork submatrix 310a includes $M_1$ rows and $N_1$ columns. If $N=N_1+N_2$ and $M=M_1+M_2$, then the intra-subnetwork submatrix 310b includes $M_2$ rows and $N_2$ columns, the inter-subnetwork submatrix 312a includes $M_1$ rows and $N_2$ columns and the inter-subnetwork submatrix 312b includes $M_2$ rows and $N_1$ columns.

Figure 6C:
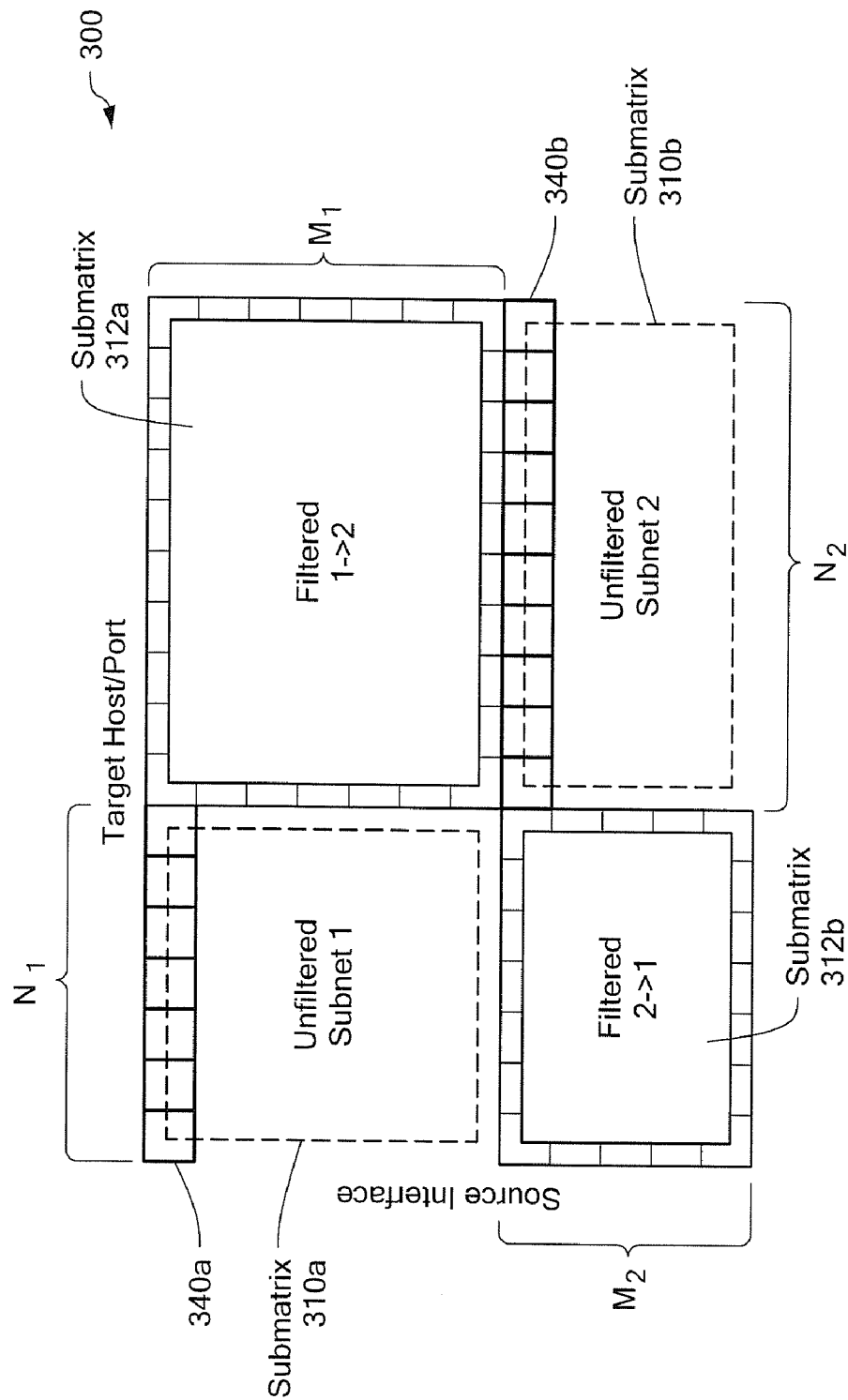

In one example, depicted in FIG. 6C, reachability groups are found within the intra-subnetwork submatrices 310a, 310b. An unfiltered reachability group 340a having $N_1$ columns and one row may be constructed for the intra-subnetwork submatrix 310a, and similarly an unfiltered reachability group 340b having $N_2$ columns and one row may be constructed for intra-subnetwork submatrix 310b.

Figure 6D:
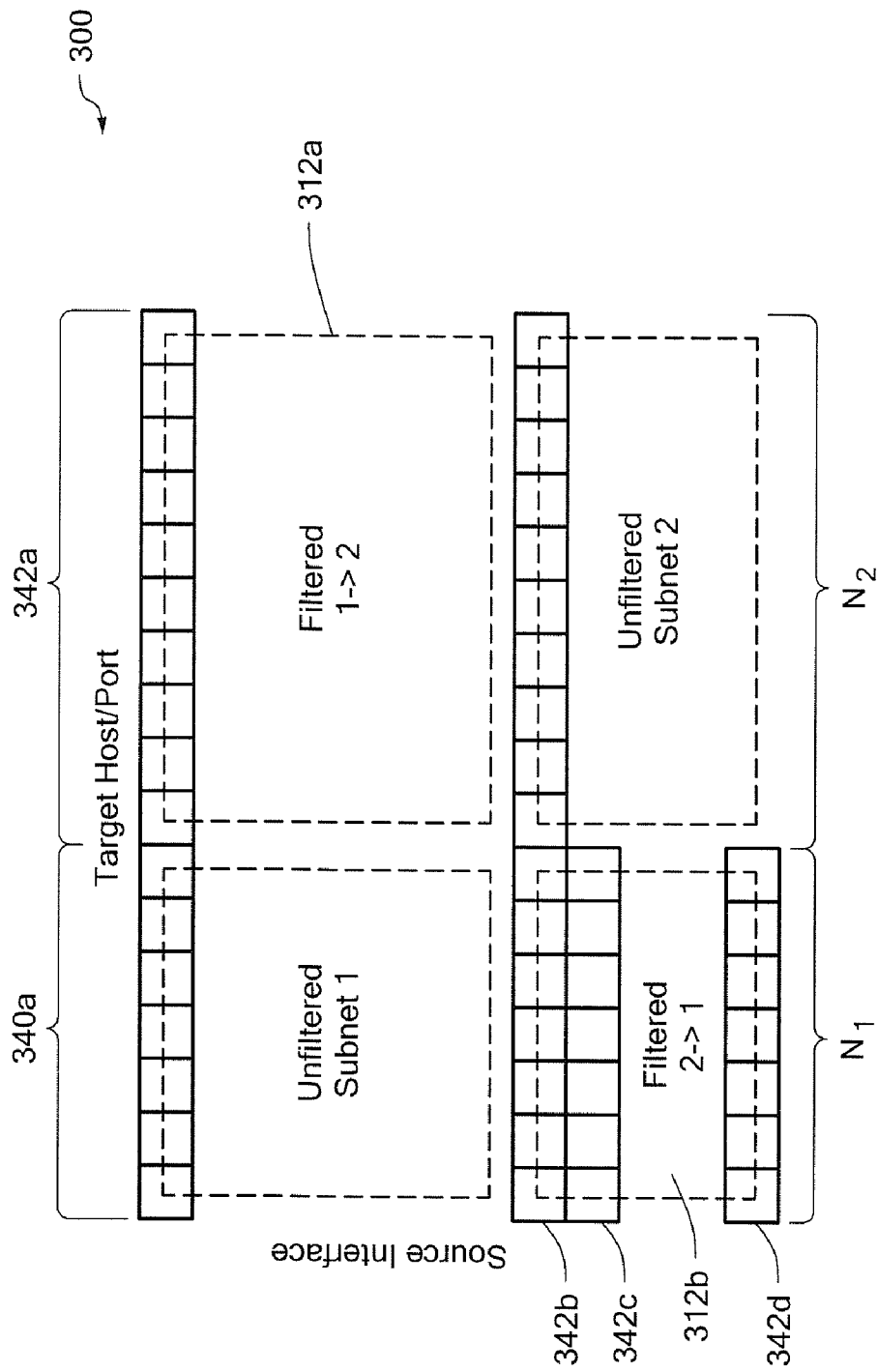

In another example depicted in FIG. 6D, reachability groups are found within the inter-subnetwork submatrices 312a, 312b. For example, one filtered reachability group 342a having $N_2$ columns and 1 row is found within the inter-subnetwork submatrix 312a, and three filtered reachability groups 342b, 342c, 342d each having $N_1$ columns and 1 row are found in the inter-subnetwork submatrix 312b. In this example, source interfaces within inter-subnetwork submatrix 312a are treated identically by the network 200 and could therefore share inter-subnetwork reachability, while interfaces in the inter-subnetwork submatrix 312b are treated in three different ways, for example, and therefore form three different filtered reachability groups.

Figure 7:
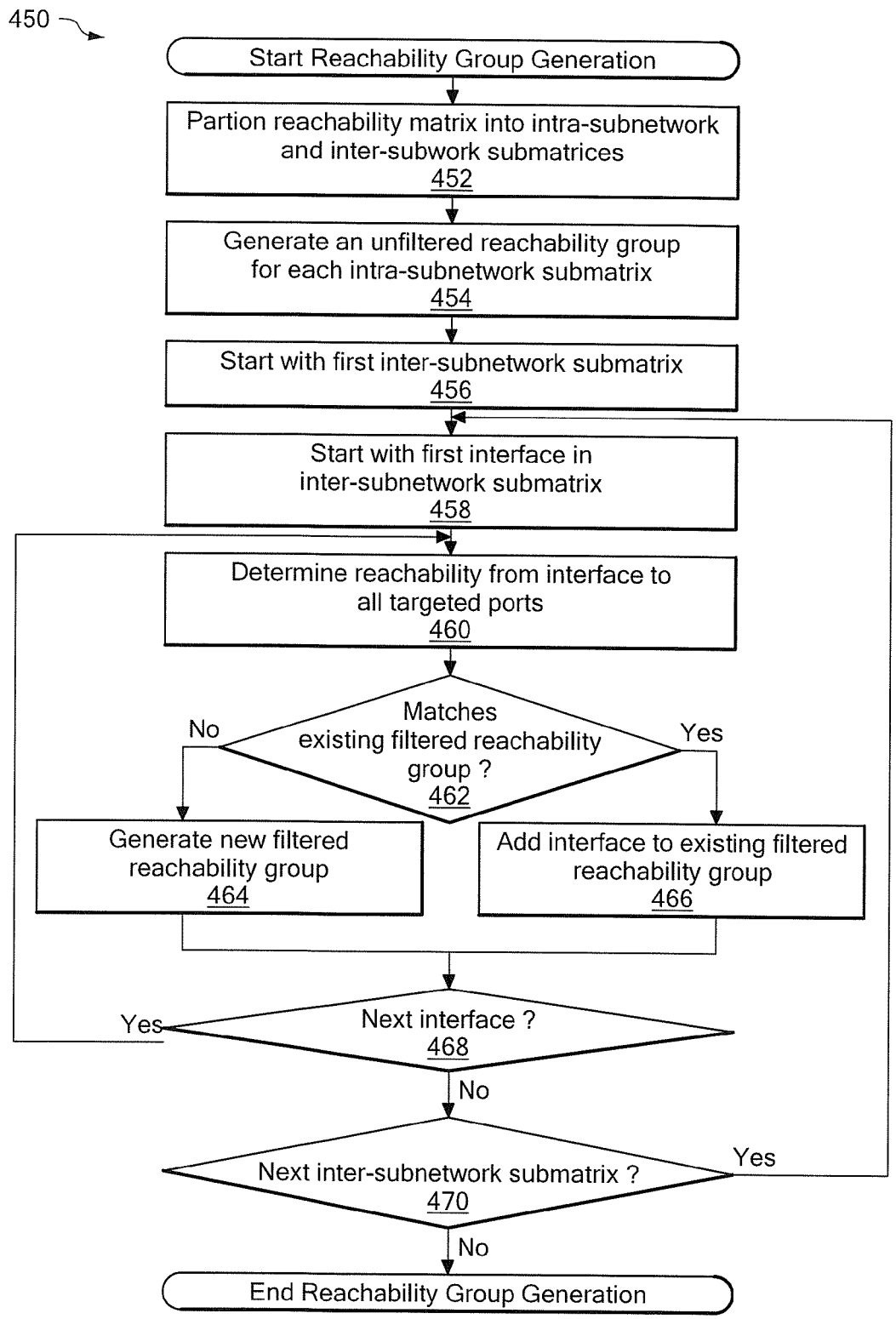
FIG. 7 is a flowchart of an example of a process to generate a reachability matrix.

An example of a process to compute reachability groups is shown in FIG. 7. The process 450 begins by grouping (452) areas of the matrix 300 into inter-subnetwork submatrices 312a, 312b and intra-subnetwork submatrices 310a, 310b. Process 150 generates (454) an unfiltered reachability group for each intra-subnetwork submatrix. For example, the unfiltered reachability group 340a is generated for the intra-subnetwork submatrix 310a, and similarly for 340b and 310b. Process 450 explores the inter-subnetwork submatrices 312a, 312b, one at a time and in any order (456). Within an inter-subnetwork submatrix 312a, 312b, process 450 examines each source interface in turn, in any order (458). For each interface, process 450 determines reachability (460) from the interface to all targeted ports within the appropriate intra-subnetwork submatrix 310a, 310b. Process 450 compares the reachability to that of known filtered reachability groups (462). If there is a match, the interface is added to the existing filtered reachability group which it matched (466). If there is no match, a new filtered reachability group is generated (464) and the interface is added to the new filtered reachability group. Process 450 determines if there is a next interface and evaluates the next interface in the inter-subnetwork submatrix 312a, 312b (468).

When evaluation of an inter-subnetwork submatrix 312a, 312b is completed, process 450 proceeds to the next inter-subnetwork submatrix 312a, 312b (470) and continues processing until all inter-subnetwork submatrices have been completed.

In most networks, the two types of reachability groups reduce the computation and storage requirements substantially. Assigning interfaces to reachability groups requires a comparatively small amount of computation compared to analyzing firewall and router filtering rules. Process 450 reduces computation and memory requirements required to compute reachability, making attack graph generation on large networks practical. For example, in the two-subnetwork matrix in FIG. 5, if the subnetworks each contain 200 hosts and each host has one open port, the number of unique entries starts at 400×400=160.000 without reachability groups, and could drop as low as 800 with reachability groups.

The formation of reachability groups may be performed using other methods than the method shown in process 450. For example, the process 450 may be able to determine if an interface belongs to an existing filtered reachability group (462) before fully computing reachability for that interface (460). For example, another approach is described in "Evaluating and Strengthening Enterprise Network Security Using Attack Graphs." Lippmann et al., MIT Lincoln Laboratory Technical Report 1A-2.

Figure 8:
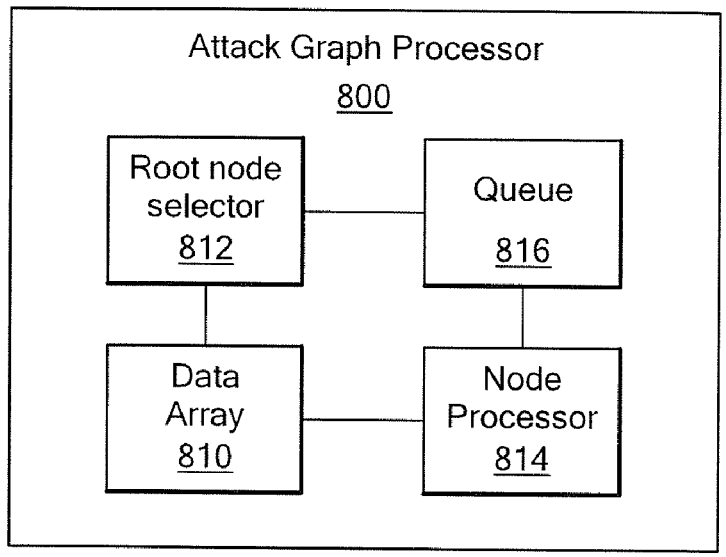
FIG. 8 is a block diagram of an attack graph processor.

Referring to FIG. 8, in one example, attack graph processor 800 includes a data array 810, a root node selector 812, a node processor 814 and a queue 816.

The data array 810 stores data in one or more arrays. The data includes data elements, for example, hosts, interfaces, ports and so forth. An array is a contiguous piece of memory in which the data elements are stored. Storing in this manner allows access to any one data element instantly. In one example, the data array 810 includes a reachability matrix (e.g., a reachability matrix 300).

The data in the array store 810 may be interconnected in three ways: one-to-one, one-to-many, and many-to-many. The one-to-one connection is done within the data element itself. An interface, for example, will have a pointer to the host to which it belongs.

A one-to-many connection is implemented in a double-redirect list. The first list contains an entry for each host, for example, and points to a location in the second list. In one example, the connection of one host to possibly many interfaces, this location is a list of interfaces ending with a "terminator" token.

The many-to-many connections, for example, include connections from ports to vulnerabilities. They are represented as a pair of one-to-many connections, e.g., one vulnerability appears on many ports; one port has many vulnerabilities.

The root node selector 812 selects the root node or nodes. For example, the root node selector 812 tries all possible attacker starting locations in turn and reports which root node if compromised is the most destructive to the network. In another example, the root node selector 812 may use all possible starting locations at once, showing every possible compromise in the network. In other examples, the root node selector receives the root node selected by a user.

In other examples, the root node selector 812 selects the root node at random. In further examples, the root node selector 812 is an intrusion detection system, which identifies a potential intruder and determines the likely avenues of attack from that intruder's location, for example.

The root node selector 812 places the root node or nodes into the queue 816.

Nodes are put into the queue 816. In one example, by following process 60, nodes are not placed into the queue 816 until they have been explored and added to the graph. In other examples, the node processor 814 places the node in a stack (not shown) instead of using the queue 816.

The node processor 814 forms the multiple-prerequisite attack tree using one or more of the processing blocks in process 60 (FIG. 3) to generate a multiple-prerequisite attack graph.

Figure 9:
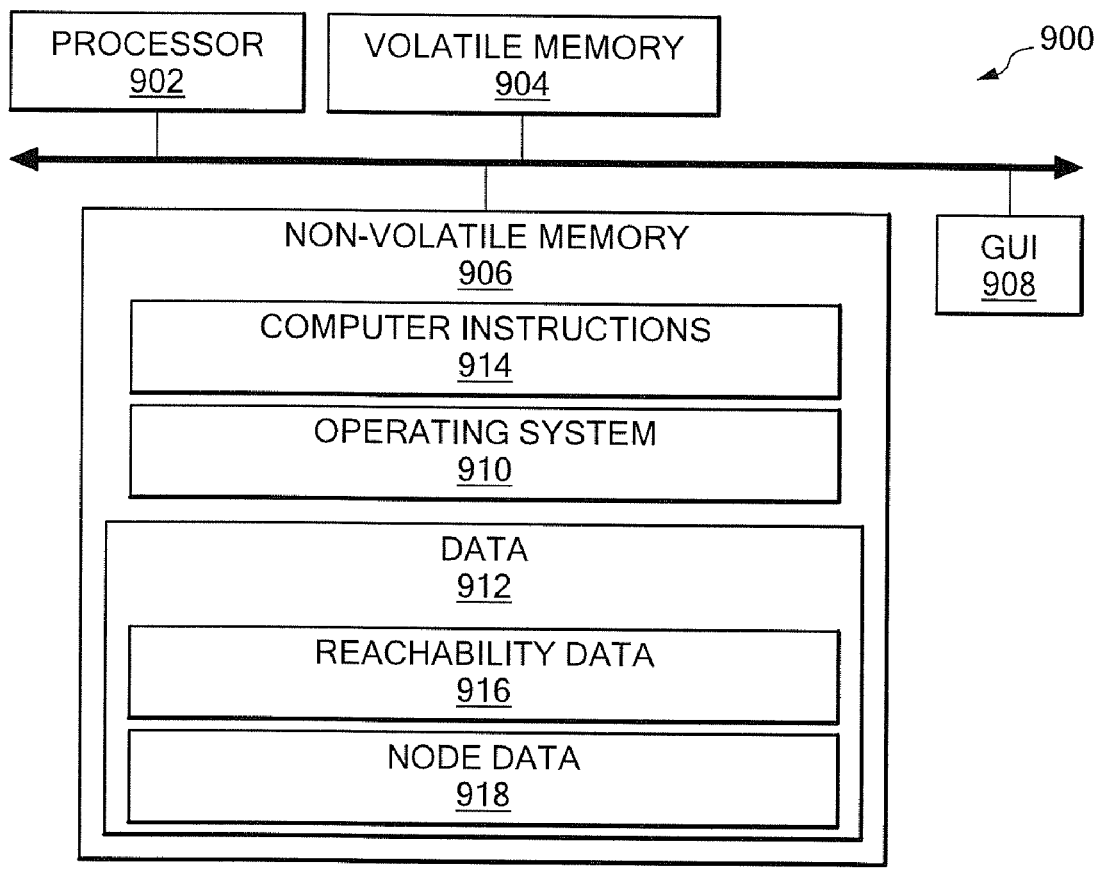
FIG. 9 is a block diagram of a computer system on which the process of FIGS. 3 and 5 may be implemented.

FIG. 9 shows a computer 900, which may be used to execute the processes herein (e.g., the process 60 and the process 150). Computer 900 includes a processor 902, a volatile memory 904, a non-volatile memory 906 (e.g., hard disk) and a graphical user interface (GUI) 908. Non-volatile memory 906 includes an operating system 910, data 912 including reachability data 916 (e.g., reachability matrices), node data 918, and computer instructions 914 which are executed out of volatile memory 904 to perform the processes (e.g., the process 60 and the process 150). The GUI 908 receives user inputs (e.g., selections of root nodes).

The processes described herein are not limited to use with the hardware and software of FIG. 9; it may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The system may be implemented, at least in part, via a computer program product, (e.g., in a machine-readable storage device or in a propagated signal)), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes (e.g., the process 60 and the process 150). The processes may also be implemented as a machine-readable storage medium, configured with a computer program, where upon execution, instructions in the computer program cause the computer to operate in accordance with the processes.

The processes described herein are not limited to the specific embodiments described herein. For example, the processes are not limited to the specific processing order of FIGS. 3 and 7. Rather, any of the blocks of FIGS. 3 and 7 may be re-ordered, combined or removed, performed in parallel or in serial, as necessary, to achieve the results set forth above.

In other examples, the processes herein may be modified to account for a hypothetical attacker starting somewhere on the network, but not on an existing host. For example, the hypothetical attacker is able to spoof source Internet Protocol addresses, which may allow the hypothetical attacker to obtain greater reachability than otherwise possible from the known hosts on the network. The processes herein are modified to use an "attacker reachability group," which is a filtered reachability group that belongs to the hypothetical attacker.

For example, the processes herein may be modified to account for the attacker having many attack starting locations to penetrate through as many firewalls as possible. In this example, an "attacker starting location" includes a state that the attacker is given at the beginning of the process, which can either be root access on a host in the network, or root access on a hypothetical attacker host starting on a specific place in the network. The hypothetical attacker host will have unfiltered and filtered reachability, just like any other host, except its filtered reachability will be a special, unique reachability group for it alone that is able to spoof source Internet Protocol addresses.

The system described herein is not limited to use with the hardware and software described above. The system may be implemented in digital electronic circuitry, or in computer hardware, firmware, software, or in combinations thereof.

Method steps associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit).

Elements of different embodiments described herein may be combined to form other embodiments not specifically set forth above. Other embodiments not specifically described herein are also within the scope of the following claims.

What is claimed is:

1. A method to generate an attack graph, comprising:
using a computer processor for:
selecting a first state node as a starting point of a cyber attack, the first state node corresponding to access to a first host in a network;
coupling the first state node to a first prerequisite node having a first precondition satisfied by the first state node by generating a first directed edge from the first state node to the prerequisite node;
coupling the first prerequisite node to a first vulnerability instance node having a second precondition satisfied by the first prerequisite node by generating a second directed edge from the first prerequisite node to the first vulnerability instance node, each vulnerability instance node on the attack graph having a single directed edge from the vulnerability instance node to exactly one state node, each vulnerability instance node indicating a presence of a vulnerability on a port, each prerequisite node representing a prerequisite required to access at least one port associated with a vulnerability instance node;
coupling the first vulnerability instance node to a second state node having a third precondition satisfied by the first vulnerability instance node by generating a third directed edge from the first vulnerability instance node to the second state node;

determining if a potential node, having a fourth precondition satisfied by a current node on the attack graph, provides a fifth precondition equivalent to one of preconditions provided by a group of preexisting nodes, the group of preexisting nodes comprising the first state node, the first vulnerability instance node, the first prerequisite node and the second state node;

if the fifth precondition is equivalent to one of the preconditions provided by the group of preexisting nodes, coupling the current node to a preexisting node providing the precondition equivalent to the fifth precondition by generating a fourth directed edge from the current node to the preexisting node; and if the fifth precondition is not equivalent to one of the preconditions provided by the group of preexisting nodes:

generating the potential node as a new node on the attack graph; and coupling the new node to the current node by generating a fifth directed edge from the current node to the new node.

2. The method of claim 1 wherein at least one of the first state node or the second state node is coupled to more than one prerequisite node.

3. The method of claim 1, further comprising using a computer processor for:

generating a second prerequisite node on the attack graph; and generating a second vulnerability instance node on the attack graph;

wherein the second vulnerability instance node has preconditions satisfied by the first prerequisite node and the second prerequisite node.

4. The method of claim 1 wherein at least one of the first state node or the second state node satisfies preconditions of more than one prerequisite node.

5. The method of claim 1 wherein the first prerequisite node is at least one of a credential node or a reachability group node.

6. The method of claim 5 wherein the credential node is associated with a credential comprising at least one of a password or passphrase used to gain access to protected data or systems.

7. The method of claim 1 wherein at least one of the first state node or the second state node represents access to a system at a specific level, the specific level comprising at least one of "other" level, a user level, or system administrator level.

8. The method of claim 1, further comprising performing the determining for each potential node.

9. The method of claim 1, further comprising using a computer processor for:

placing the first state node in a data store; and if the fifth precondition is not equivalent to one of the preconditions provided by the group of preexisting nodes, placing the potential node in the data store.

10. The method of claim 9 wherein the data store is a queue.

11. The method of claim 1, further comprising using a computer processor for selecting a third state node as a second starting point of the cyber attack, the third state node corresponding to access to a third host in the network.

12. The method of claim 1 wherein one or more of the edges are contentless.

13. A method to generate an attack graph comprising: using a computer processor for:

determining if a potential node provides a first precondition equivalent to one of preconditions provided by a group of preexisting nodes on the attack graph, the group of preexisting nodes comprising a first state node, a first vulnerability instance node, a first prerequisite node, and a second state node, each vulnerability instance node on the attack graph having a single directed edge from the vulnerability instance node to exactly one state node, each vulnerability instance node indicating a presence of a vulnerability on a port, each prerequisite node representing a prerequisite required to access at least one port associated with a vulnerability instance node;

if the first precondition is equivalent to one of the preconditions provided by the group of preexisting nodes, coupling a current node on the attack graph to a preexisting node providing the precondition equivalent to the first precondition by generating a first directed edge from the current node to the preexisting node; and if the first precondition is not equivalent to one of the preconditions provided by the group of preexisting nodes: generating the potential node as a new node on the attack graph and coupling the new node to the current node by generating a second directed edge from the current node to the new node.

14. The method of claim 13, further comprising using a computer processor for:

selecting the first state node as a starting point of a cyber attack, the first state node corresponding to access to a first host in a network;

coupling the first state node to the first prerequisite node using a first edge; and coupling the first prerequisite node to the first vulnerability instance node using a second edge.

15. The method of claim 14, further comprising using a computer processor for selecting a second state node as a second starting point of the cyber attack, the second state node corresponding to access to a second host in the network.

16. The method of claim 13 wherein the first prerequisite node is at least one of a credential node or a reachability group node.

17. A multiple-prerequisite attack graph, comprising:

a first state node corresponding to access to a first host in a network, the first host being a starting point of a cyber attack on the network;

a first prerequisite node coupled to the first state node by a first directed edge from the first state node to the first prerequisite node;

a first vulnerability instance node coupled to the first prerequisite node by a second directed edge from the first prerequisite node to the first vulnerability instance node and coupled to a second state node by a third directed edge from the first vulnerability instance node to the second state node, the second state node corresponding to access to a second host in the network, each vulnerability instance node on the attack graph having a single directed edge from the vulnerability instance node points to exactly one state node, each vulnerability instance node indicating a presence of a vulnerability on a port, each prerequisite node representing a prerequisite required to access at least one port associated with a vulnerability instance node; and a current node coupled to one of a group of preexisting nodes by a fourth directed edge from the current node to the one of the group of preexisting nodes, the one of a group of preexisting nodes satisfying a precondition equivalent to a precondition provided by a potential node, the group of preexisting nodes comprising the first state node, the first vulnerability instance node and the first prerequisite node, wherein the multiple-prerequisite attack graph is rendered by a computer processor.

18. The graph of claim 17, further comprising a new node coupled to the current node by a fifth edge, the new node providing a precondition not equivalent to preconditions provided by the group of preexisting nodes.

19. The graph of claim 18 wherein the new node is one of a third state node representing one of new higher-level privileges on the second host or access to a new host; a second vulnerability instance node; or a second prerequisite node.

20. The graph of claim 17 wherein the first prerequisite node is one of a reachability node or a credential node.

21. The graph of claim 20 wherein the credential node is associated with a credential comprising at least one of a password used to gain access to protected data or systems.

22. An apparatus to generate an attack graph, comprising: circuitry to:
couple a first state node to a first prerequisite node having a first precondition satisfied by the first state node by generating a first directed edge from the first state node to the first prerequisite node, the first state node being a starting point of a cyber attack and corresponding to access to a first host in a network;
couple the first prerequisite node to a first vulnerability instance node having a second precondition satisfied by the first prerequisite node by generating a second directed edge from the first prerequisite node to the first vulnerability instance node, each vulnerability instance node on the attack graph having a single directed edge from the vulnerability instance node to exactly one state node, each vulnerability instance node indicating a presence of a vulnerability on a port, each prerequisite node representing a prerequisite required to access at least one port associated with a vulnerability instance node;
couple the first vulnerability instance node to a second state node having a third precondition satisfied by the first vulnerability instance node by generating a third directed edge from the first vulnerability instance node to the second state node;
determine if a potential node, having a fourth precondition satisfied by a current node on the attack graph, provides a fifth precondition equivalent to preconditions provided by a group of preexisting nodes, the group of preexisting nodes comprising the first state node, the first vulnerability instance node, the first prerequisite node and the second state node;
if the fifth precondition is equivalent to one of the preconditions provided by the group of preexisting nodes, couple the current node to a preexisting node providing the precondition equivalent to the fifth precondition by generating a fourth directed edge from the current node to the preexisting node; and
if the fifth precondition is not equivalent to one of the preconditions provided by the group of preexisting nodes:
generate the potential node as a new node on the attack graph; and
couple the new node to the current node by generating a fifth directed edge from the current node to the new node.

23. The apparatus of claim 22 wherein the circuitry comprises at least one of a processor, a memory, programmable logic or logic gates.

24. The apparatus of claim 22 wherein at least one of the first state node or the second state node is coupled to more than one prerequisite node.

25. The apparatus of claim 22 further comprising circuitry to:
select the first state node as the starting point of the cyber attack; and
select a third state node as a second starting point of the cyber attack, the third state node corresponding to access to a third host in the network.

26. The apparatus of claim 22, further comprising circuitry to:
generate a second prerequisite node on the attack graph; and
generate a second vulnerability instance node on the attack graph;
wherein the second vulnerability instance node has preconditions satisfied by the first prerequisite node and the second prerequisite node.

27. The apparatus of claim 22 wherein at least one of the first state node or the second state node satisfies preconditions of more than one prerequisite node.

28. The apparatus of claim 22 wherein the first prerequisite node is at least one of a credential node or a reachability group node.

29. An article comprising:
a non-transitory machine-readable medium that stores executable instructions to generate an attack graph, the instructions causing a machine to:
couple a first state node to a first prerequisite node having a first precondition satisfied by the first state node by generating a first directed edge from the first state node to the first prerequisite node, the first state node being a starting point of a cyber attack and corresponding to access to a first host in a network;
couple the first prerequisite node to a first vulnerability instance node having a second precondition satisfied by the first prerequisite node by generating a second directed edge from the first prerequisite node to the first vulnerability instance node, each vulnerability instance node on the attack graph having a single directed edge from the vulnerability instance node to exactly one state node, each vulnerability instance node indicating a presence of a vulnerability on a port, each prerequisite node representing a prerequisite required to access at least one port associated with a vulnerability instance node;
couple the first vulnerability instance node to a second state node having a third precondition satisfied by the first vulnerability instance node by generating a third directed edge from the first vulnerability instance node to the second state node;
determine if a potential node, having a fourth precondition satisfied by a current node on the attack graph, provides a fifth precondition equivalent to preconditions provided by a group of preexisting nodes, the group of preexisting nodes comprising the first state node, the first vulnerability instance node, the first prerequisite node and the second state node;
if the fifth precondition is equivalent to one of the preconditions provided by the group of preexisting nodes, couple the current node to a preexisting node providing the precondition equivalent to the fifth precondition by generating a fourth directed edge from the current node to the preexisting node; and if the fifth precondition is not equivalent to one of the preconditions provided by the group of preexisting nodes:
generate the potential node as a new node on the attack graph; and
couple the new node to the current node by generating a fifth directed edge from the current node to the new node.

30. The article of claim 29 wherein at least one of the first state node or the second state node is coupled to more than one prerequisite node.

31. The article of claim 29 wherein at least one of the first state node or the second state node satisfies preconditions of more than one prerequisite node.

32. The article of claim 29 wherein the first prerequisite node is at least one of a credential node or a reachability group node.

33. The article of claim 29, further comprising instructions causing a machine to:
select a first state node as the starting point of a cyber attack; and
select a third state node as a second starting point of the cyber attack, the third state node corresponding to access to a third host in a network.

* * * * *

UNITED STATES PATENT AND TRADEMARK OFFICE
CERTIFICATE OF CORRECTION

PATENT NO. : 7,971,252 B2
APPLICATION NO. : 11/760158
DATED : June 28, 2011
INVENTOR(S) : Lippmann et al.

It is certified that error appears in the above-identified patent and that said Letters Patent is hereby corrected as shown below:

Col. 9, line 55, delete "nodes new" and replace with --node is new--.

Col. 10, lines 6-7, delete "prerequisite 104b." and replace with -- prerequisite node 104b.--.

Col. 10, line 13, delete "instance" and replace with --instance nodes--.

Col. 10, line 19, delete "instance" and replace with --instance node--.

Col. 11, line 15, delete "pot." and replace with --port.--.

Col. 16, lines 57-58, delete "node points to" and replace with --node to--.

Signed and Sealed this
Thirteenth Day of September, 2011

David J. Kappos
*Director of the United States Patent and Trademark Office*